(12) United States Patent
Miura et al.

(10) Patent No.: US 6,210,017 B1
(45) Date of Patent: Apr. 3, 2001

(54) SELF-EMISSION ROAD DEVICE FOR STRAIGHT OR CURVED ROAD SURFACE

(75) Inventors: Masanori Miura, Toyohashi; Fumiyoshi Tobiyasu, Shinshiro, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/322,035

(22) Filed: May 28, 1999

(51) Int. Cl.[7] ......................................................... E01F 9/04
(52) U.S. Cl. .......................... 362/153.1; 362/153; 362/240
(58) Field of Search ................................. 362/153.1, 153, 362/235, 240, 234, 244, 145, 227, 236, 470

(56) References Cited

U.S. PATENT DOCUMENTS

| | | | |
|---|---|---|---|
| 3,996,556 | * 12/1976 | Eigenmann | 362/153.1 |
| 4,914,544 | * 4/1990 | Dahlberg | 362/153.1 |
| 5,105,347 | * 4/1992 | Ruud et al. | 362/153.1 |
| 5,335,151 | * 8/1994 | Dahlberg | 362/153.1 |
| 5,343,375 | * 8/1994 | Gross et al. | 362/153 |
| 5,414,603 | * 5/1995 | Conway | 362/153.1 |
| 5,680,033 | * 10/1997 | Cha | 362/153.1 |
| 5,839,816 | * 11/1998 | Varga et al. | 362/153.1 |
| 5,984,570 | * 11/1999 | Parashar | 362/153.1 |

FOREIGN PATENT DOCUMENTS

| | | |
|---|---|---|
| 07034423 | 2/1995 | (JP) . |
| 08311829 | 11/1996 | (JP) . |
| 10252025 | 9/1998 | (JP) . |
| 10266145 | * 10/1998 | (JP) . |
| 10266144 | 10/1998 | (JP) . |

* cited by examiner

*Primary Examiner*—Sandra O'Shea
*Assistant Examiner*—Bao Truong
(74) *Attorney, Agent, or Firm*—Burns, Doane, Swecker & Mathis, LLP

(57) ABSTRACT

A self-emission road device includes light emitting elements and a power unit, and has the light emitting elements emit light through a light emitting face of a protective board set at an upper part of the self-emission road device. For each light emitting face, four emission units are provided. Out of the four emission units, two emission units are designed for a straight road and light beams from these emission units are emitted in a direction whose horizontal component is perpendicular to the light emitting face. Two other emission units are designed for a curve and light beams from these emission units are emitted in a direction whose horizontal component forms a predetermined angle with the direction whose horizontal component is perpendicular to the light emitting face. The emission units for the straight road and curve are set in alternate order. When the emission units for the curve are provided for two light emitting faces that are diametrically opposite to each other, the light beams passing through the two different light emitting faces are emitted in the respective directions tilting toward the same side.

18 Claims, 11 Drawing Sheets

SELF-EMISSION ROAD DEVICE FOR STRAIGHT OR CURVED ROAD SURFACE

BACKGROUND OF THE INVENTION

(1) Field of the Invention

The present invention relates to a self-emission road device that is set on a road at a center line or intersection and used for warning and visually guiding car drivers and pedestrians by emitting lights from light emitting elements using a power unit provided in the self-emission road device, thereby preventing traffic accidents.

(2) Related Art

Self-emission road devices have been used mainly for preventing traffic accidents. These self-emission road devices emit lights from internal light elements so that car drivers and pedestrians can clearly see certain positions such as a center line and a center of an intersection.

Such a self-emission road device has a main body and a protective board. The main body includes light emitting elements, such as light emitting diodes, and a power unit for supplying power for the light emitting elements. The protective board is set on the top of the main body, and has one or more light emitting faces. Here, each light emitting face is set on a different side of the protective board. The lights from the light emitting elements are emitted to the outside through the light emitting faces.

The self-emission road device is set on a road so that the protective board protrudes from the road surface, with the main body being buried in the ground. The lights from the light emitting elements are emitted to the outside through the light emitting faces. By means of the emitted lights, the drivers and pedestrians can clearly see certain positions at nighttime, such as a center line, a center of an intersection, and a pedestrian crossover.

In this example of related art, the lights passing through one light emitting face are emitted in the same direction. As such, this one kind of self-emission road device cannot be applied to all of various shapes of roads, such as a straight road and a curve. Hereinafter, the direction in which a light is emitted is referred to as the "emitting direction (of the light)."

In general, the self-emission road device is set so that the light emitting faces are almost horizontally perpendicular to the direction in which the road runs. Thus, when the self-emission road device is set on a straight road, it needs to be set so that emitting direction of the lights is perpendicular to the light emitting face. Meanwhile, when the self-emission road device is set on a curve, a horizontal angle formed between the emitting direction of the lights and the light emitting face needs to be appropriately set in accordance with the curve. For this reason, different kinds of self-emission road devices, each of which has a different emitting direction, need to be provided corresponding to the various shapes of roads.

Furthermore, prior to the setting of the self-emission road device on a road, the road needs to be checked to select a self-emission road device, out of the different kinds of self-emission road devices, that emits the lights in an optimum direction for the road. Accordingly, the self-emission road device has been set at much expense in time and effort.

SUMMARY OF THE INVENTION

Therefore, the object of the present invention is to provide a self-emission road device which emits lights that are clearly seen at nighttime regardless of the shape of a road, i.e., whether it is straight or curved, without providing different kinds of self-emission road devices.

The object of the present invention can be achieved by a self-emission road device which is partially buried in a road surface, the self-emission road device being made up of: a main body which has an opening at a top; an emission unit which is set at an upper part of the main body and emits at least three light beams over a road; and a top board which is set covering the opening of the main body, and has an emission window that is transparent, with the light beams from the emission unit passing through the emission window and being emitted to an outside, where emitting directions in which the light beams are emitted through the emission window include at least first and second directions.

With this construction, the emission unit emits at least three light beams through an emission window provided for the top board, with the number of emitting directions emitted from the emission unit being at least two. Consequently, the lights emitted from the road self-emission device can be seen from various directions.

When at least two light beams, out of the plurality of the light beams emitted to the outside through the emission window, are emitted in the same direction, a light beam emitted in a different direction is situated between two light beams emitted in the same direction.

With this construction, two light beams emitted in the same direction are not situated next to each other. Therefore, areas of the emission window where the light beams respectively pass through are hardly overlapped, and the respective areas exposed to the lights on the emission window are increased. This results in a state where the emission window is fully lighted. Consequently, the lights from the emission unit can be more clearly seen by the car drivers and pedestrians.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENT

The following is a description of a self-emission road device of the present invention used in an embodiment, with reference to the drawings.

Figure 1:
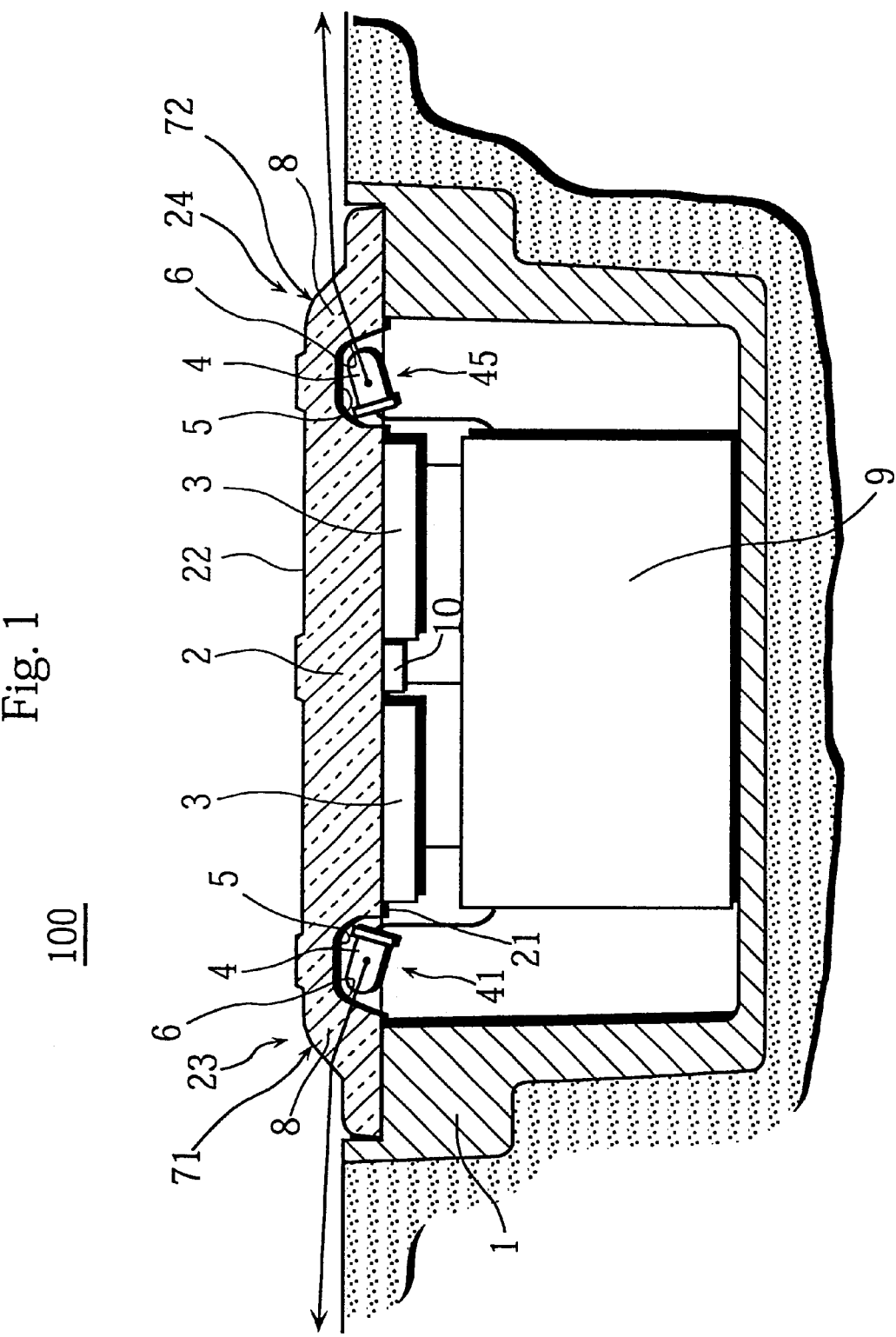
FIG. 1 shows a vertical sectional view of a self-emission road device of the present invention.

FIG. 1 shows a vertical sectional view of a self-emission road device 100 of the present embodiment, with this sectional view being taken along a plane including each dent 5 of emission units 41 and 45.

The self-emission road device 100 is composed of a protective board 2 and a main body 1 that is cup-shaped and includes two solar batteries 3, eight light emitting diodes 4, a power unit 9, and a photoelectric sensor 10. The protective board 2 is transparent and set on an opening of the main body 1.

The protective board 2 is made of colorless transparent resin and formed by the injection molding method, being secured to the main body 1 by bolts (not shown). Polycarbonate (PC) is used as such colorless resin on account of its high durability.

Slant parts are respectively formed on both sides of an upper principal plane 22 of the protective board 2, and are referred to as light emitting faces 71 and 72. The lights pass through these slant parts and emitted to the outside.

Four emission units 41 to 44 and another four emission units 45 to 48 are respectively set in line on a lower principal plane 21 of the protective board 2, facing the corresponding light emitting faces 71 and 72 (see FIG. 1). FIG. 1 shows only the emission units 41 and 45 that are located on the cross section. The emission units 41 to 48 have the same construction except for their emitting angles in the horizontal direction as described later. The construction is explained only for the emission unit 45 as one example.

The emission unit 45 has a light emitting diode 4 that is housed in the dent 5 located on the lower principal plane 21 of the protective board 2. The dent 5 has a flat front 6. The light emitted from the light emitting diode 4 passes through a refractor 8 before passing through the light emitting face 72. The light is then emitted to the outside, with the emitting direction being refracted slightly downward as compared with the actual emitting direction of the light from the light emitting diode 4. The refractor 8 serves as a prism which is formed by resin located between the flat front 6 and the light emitting face 72.

The light emitting diode 4 is held by the main body 1 via a supporting frame (not shown) so that the light emitting diode 4 fits into the corresponding dent 5 when the protective board 2 is set on the main body 1. Similarly, the solar batteries 3 and the photoelectric sensor 10 are held by the main body 1 via respective supporting frames (not shown) so that their light receiving faces almost come in contact with the lower principal plane 21 when the protective board 2 is set on the main body 1.

Figure 2:
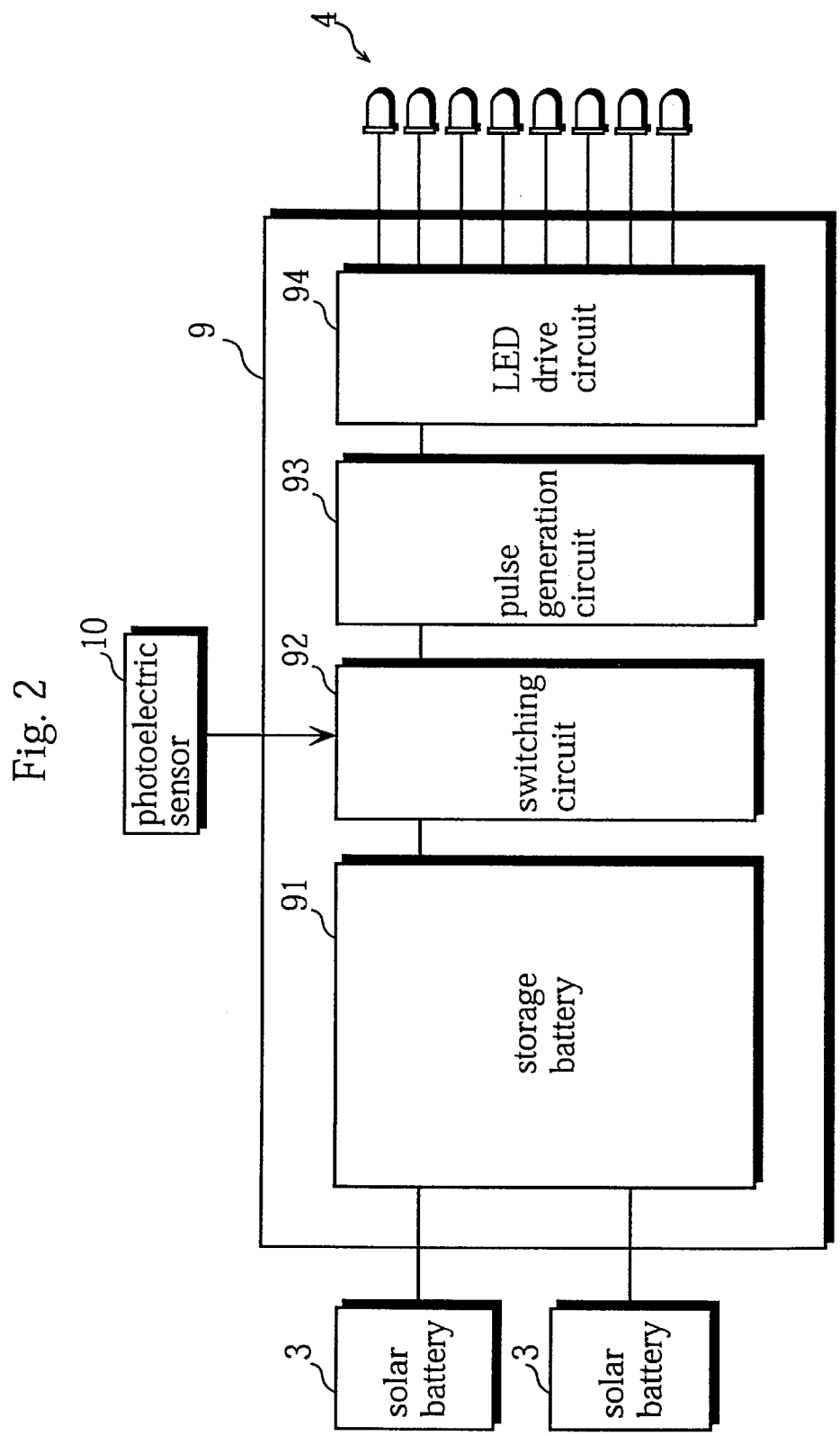
FIG. 2 is a block diagram showing the construction of a power unit provided in the self-emission road device.

The power unit 9 has a well-known construction including a storage battery and an LED drive circuit. FIG. 2 shows an example of a block diagram showing the construction of the power unit 9.

The two solar batteries 3 receive sunlight during daytime to generate electric power, and this electric power is accumulated in a storage battery 91. An output voltage of the photoelectric sensor 10 is transmitted to a switching circuit 92. When the output voltage is below a predetermined threshold, the switching circuit 92 turns on an internal relay circuit so that a pulse generation circuit 93 is energized. The pulse generation circuit 93 generates a pulse current at predetermined intervals and transmits the pulse current to an LED drive circuit 94. On receiving the drive current, the LED drive circuit 94 has the light emitting diode 4 emit the light. Accordingly, the light from the light emitting diode 4 blinks on and off at the predetermined intervals, thereby calling more attention of the car drivers and pedestrians.

Figure 3:
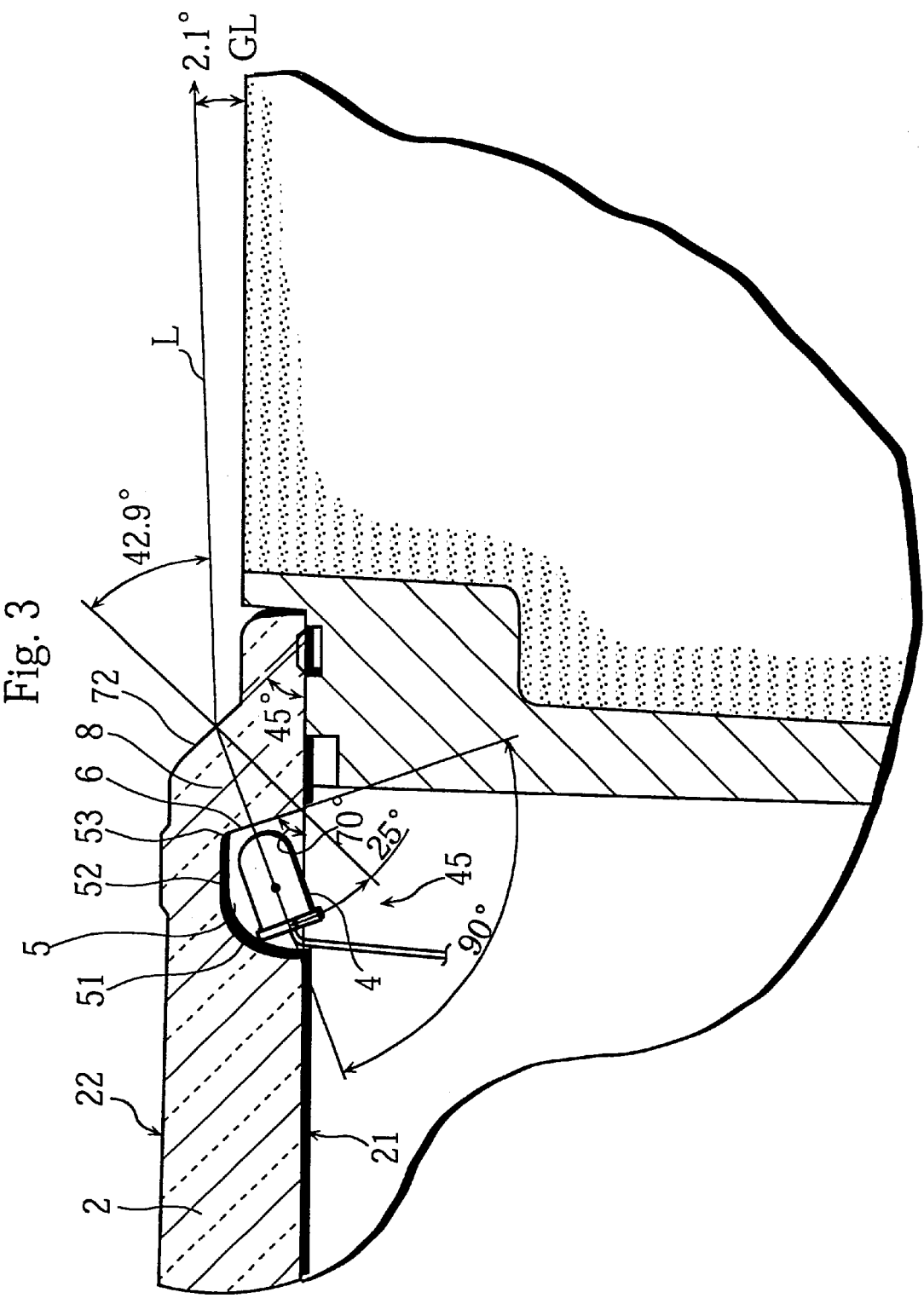
FIG. 3 shows an enlarged sectional view of a dent that is provided in a protective board and includes a light-emitting diode of an emission unit.

FIG. 3 shows an enlarged sectional view of the emission unit 45 to explain the configuration of the dent 5 in detail.

The flat front 6 of the dent 5 forms a 70° angle with the lower principal plane 21 of the protective board 2. A tilt of the light emitting diode 4 is set so that an axis L of the light beam emitted by the light emitting diode 4 is perpendicular to the flat front 6. Meanwhile, the light emitting face 72 forms a 45° angle with the lower principal plane 21.

The light from the light emitting diode 4 is incident on the light emitting face 72 at a 25° angle of incident. Here, since the refractive index of polycarbonate is 1.61, the axis L of the light beam is emitted through the light emitting face 72 to the outside at a 42.9° angle of emergence as shown in FIG. 3.

Figure 4:
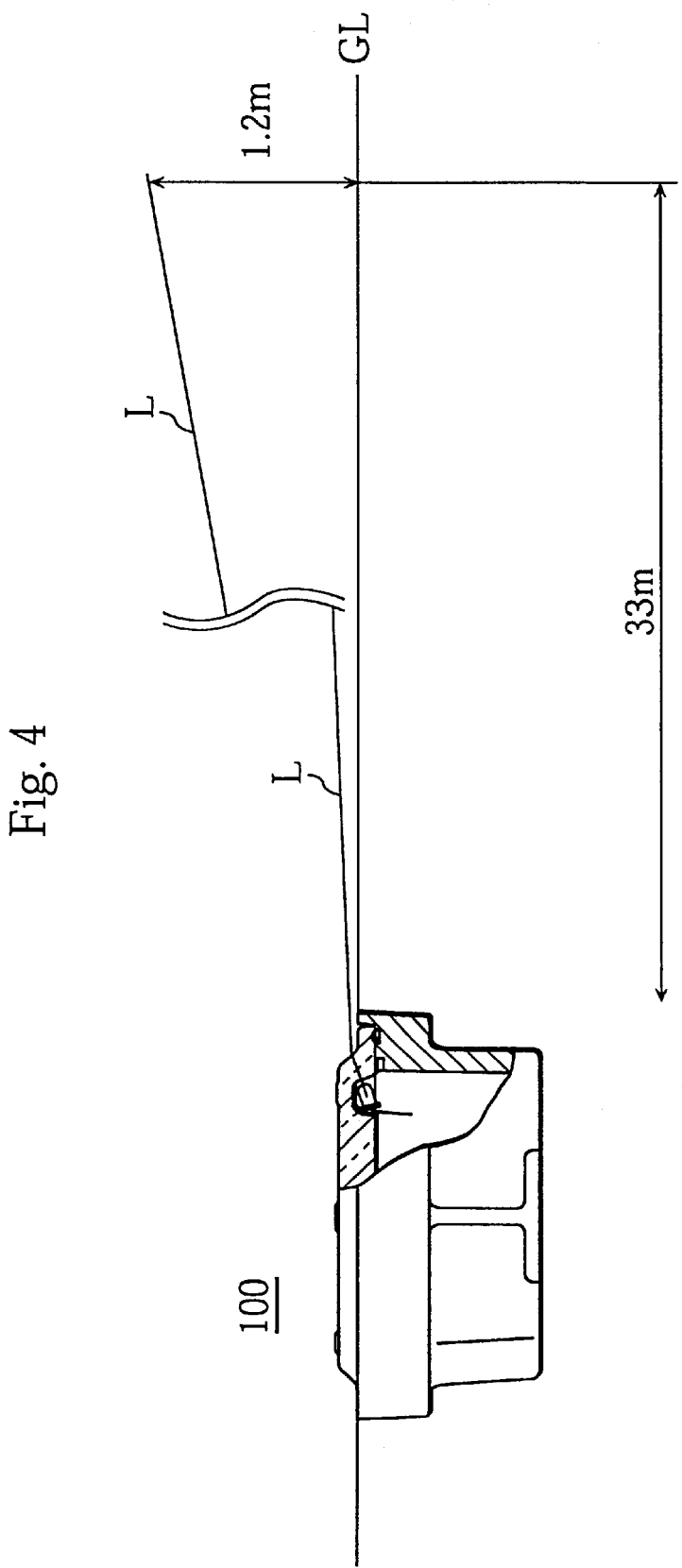
FIG. 4 shows a path of the light emitted from the self-emission road device.

In general, the self-emission road device 100 is set so that the upper and lower principal plane 22 and 21 of the protective board 2 are horizontal to a ground level GL. As such, the axis L of the light beam passes through the light emitting face 72 and emitted to the outside at a 2.1° angle of elevation formed with the ground level GL. In this case, at a position located 33 m before the self-emission road device 100 on a straight road, the axis L of the light beam passes by a point which is 1.2 m high from the ground level GL as shown in FIG. 4. The point located 1.2 m high from the ground level GL almost corresponds to the height of line of sight for those who are driving passenger cars. Accordingly, the drivers in the passenger cars can clearly see the light emitted from the self-emission road device 100 from the position located 33 m before the self-emission road device 100.

Figure 5A:
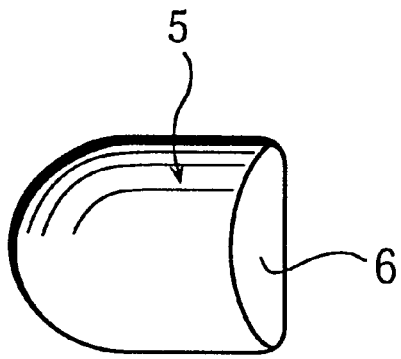
FIG. 5A shows the dent viewed under the protective board.
Figure 5B:
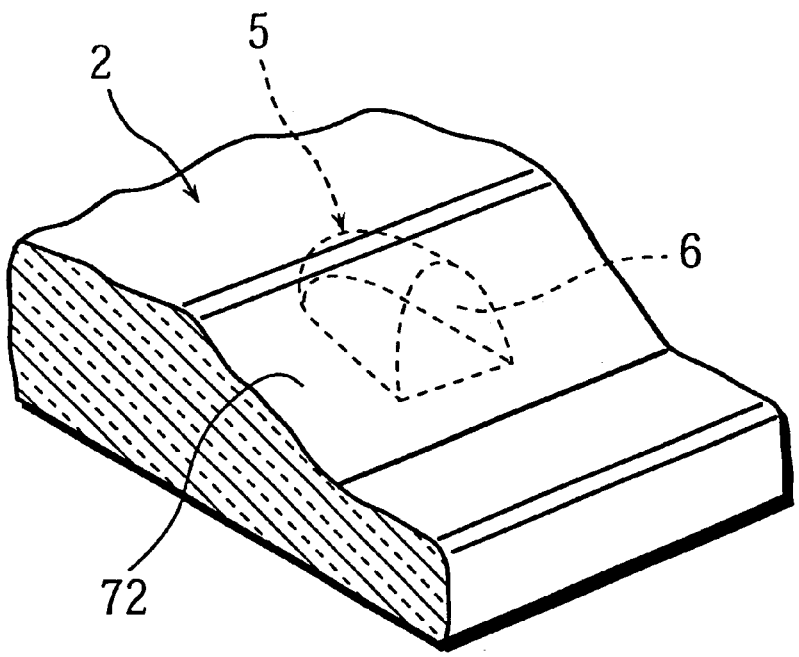
FIG. 5B is a perspective view of the dent viewed from the upper direction.

As shown in the cross-sectional profile of FIG. 3, a rear 51 of the dent 5 and an edge 53 where a ceiling 52 meets the flat front 6 are rounded off and form gentle curves. FIG. 5A shows the appearance of the dent 5 viewed under the lower principal plane 21 of the protective board 2. FIG. 5B is a perspective view of the dent 5 viewed from the upper direction of the light emitting face 72. As shown in these figures, the dent 5 is formed so that the cross-sectional profile taken along a plane that is parallel to the flat front 6 has a dome-shaped roof.

In this way, the dent 5 is formed mainly with curved surfaces, and the edge 53 where the ceiling 52 meets the flat front 6 is rounded off. Consequently, the durability of the protective board 2 can be improved.

The dents that house light emitting diodes in the self-emission road device of related art have square-corners, that is, relatively sharp edges where inner faces meet each other. While the weight of a passing car produces a strong bending stress in the present invention, stresses are concentrated at the sharp edges in the self-emission road device of related art, making it susceptible to cracking. In the present embodiment, internal surfaces of the dent 5 are formed mainly with curved surfaces, so that there are few sharp edges where the stress concentrations occur. This significantly improves the durability of the protective board 2.

Moreover, in the present embodiment, an edge 23 where the light emitting face 71 meets the upper principal plane 22, and an edge 24 where the light emitting face 72 meets the upper principal plane 22 are also rounded off as shown in FIG. 1. The stress concentrations are also prevented at these points, so that the durability of the protective board 2 is improved.

Figure 6:
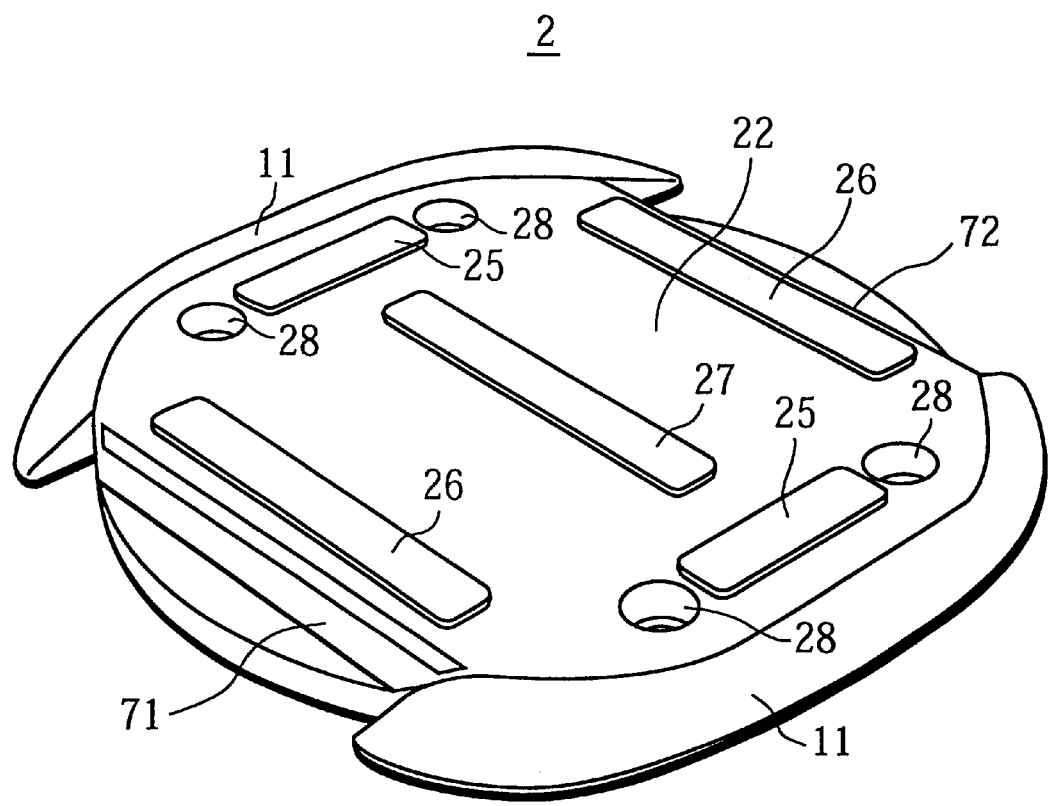
FIG. 6 is a perspective external view of the protective board of the self-emission road device.

FIG. 6 is a perspective external view of the protective board 2. As shown in this figure, protrusions 25, 26, and 27, which each have the form of a thin plate, are integrally formed on the upper principal plane 22 of the protective board 2. Each of the protrusions 25 to 27 are formed for reinforcing the protective board 2.

Each of the protrusions 25 is situated between a pair of holes 28 through which bolts pass so that the protective board 2 is secured to the main body 1. The protrusions 26 are respectively situated above the emission units 41 to 44 and 45 to 48. The protrusion 27 is situated at the middle of the protective board 2, but not being overlapped with the light receiving faces of the solar batteries 3 and the photoelectric sensor 10.

Each surface of the protrusions 25 to 27 is opaque, like a frosted glass, being processed by a given method. By means of the opaque surfaces, the sunlight will not unnecessarily enter into the self-emission road device, so that components provided in the self-emission road device 100 are protected and also prevented from deteriorating.

Brims 11 are respectively set on sides other than the two sides serving as the light emitting faces 71 and 72, as shown in FIG. 6. The brims 11 are made of metal or resin that is stronger than the resin used for making the protective board 2, thereby reinforcing the protective board 2. Both ends of each brim 11 are formed as shown in FIG. 6 so as not to interfere with the light emission from the light emitting faces 71 and 72 (see FIG. 7).

Next, the following is a description of arrangements of the emission units 41 to 48 and their angles of emergence in the horizontal direction.

Figure 7:
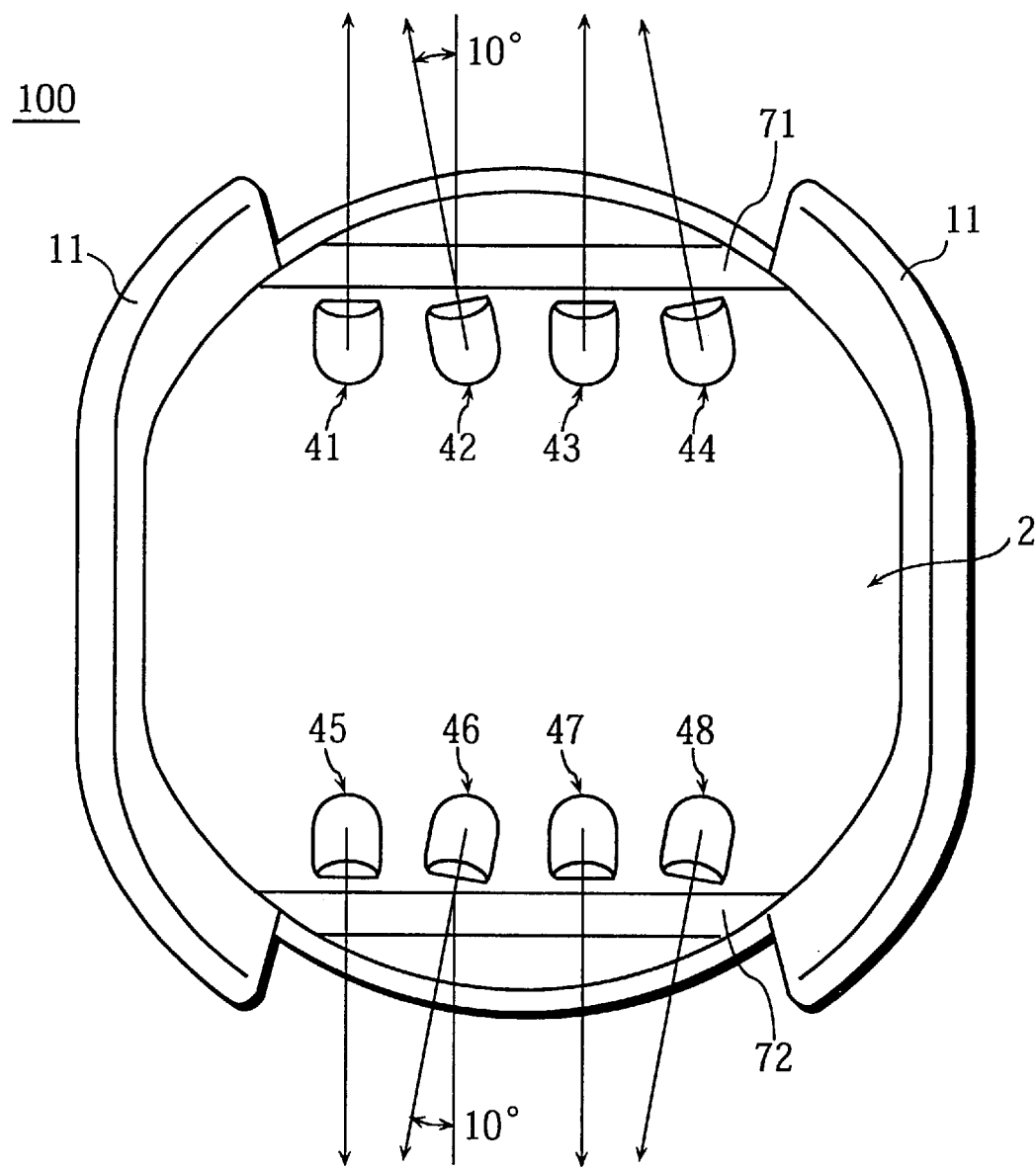
FIG. 7 is a schematic view of the self-emission road device viewed from above.

FIG. 7 shows the self-emission road device 100 viewed from above. For convenience in drawing FIG. 7, the illustration of the protective board 2 is simplified and each light emitting diode 4 of the dents 5 are not illustrated. Note that the dents 5 are drawn in solid lines to clearly indicate their positions.

As shown in FIG. 7, in the protective board 2, the emission units 41 to 44 and 45 to 48 are respectively set along the light emitting faces 71 and 72. The emission units 41, 43, 45, and 47 are designed for a straight road, and their emitting directions are set perpendicular to the light emitting faces 71 and 72 in the horizontal direction. Meanwhile, the emission units 42, 44, 46, and 48 are designed for a curve, and their emitting directions are set at a 10° angle of tilt to the left (as the protective board 2 is viewed in FIG. 7) with respect to the emitting directions in which the emission units 41, 43, 45, and 47 emit the lights.

Each tilt of the emitting directions of the lights that are emitted from the emission units 41 to 48 and pass through the light emitting faces 71 and 72 is determined mainly by a tilt of the flat front 6 of the dent 5 in the horizontal direction. Note here that the light emitting diode 4 is set so that the emitting direction of the light is perpendicular to the corresponding flat front 6.

In this way, along each of the light emitting faces 71 and 72, the emission units 41 to 48 for the straight road and the curve are set as shown in FIG. 7. Also, the emitting directions of the emission units 42, 44, 46, and 48 for the curve set along the light emitting faces 71 and 72 tilt toward the same side (i.e., to the left in FIG. 7). Therefore, regardless of the shapes of roads, the car drivers can clearly see the lights from the self-emission road device 100. An explanation is given more specifically as follows.

On a straight road, a car driver can see the lights emitted from the emission units 41 and 43, or 45 and 47, according to the direction in which the car is headed.

Figure 8A:
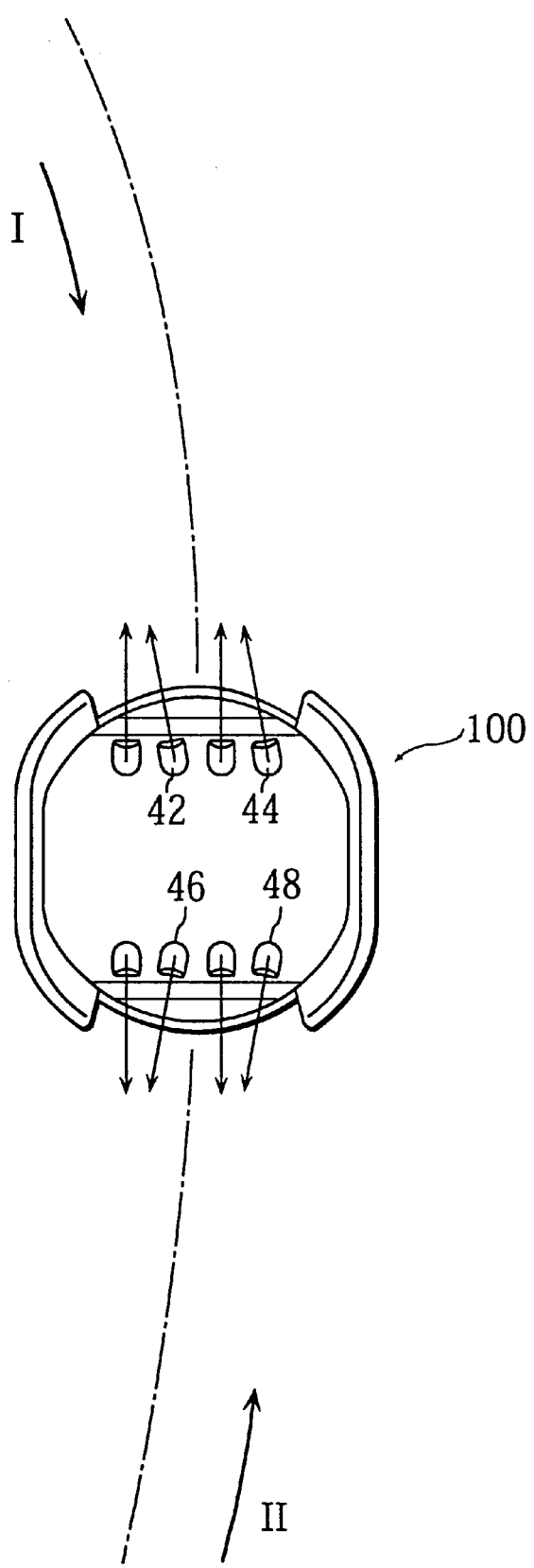
FIGS. 8A to 8C are drawings to help explain that car drivers can see the lights emitted from the self-emission road device of the present invention regardless of the shapes of the roads.

When a road makes a curve to the left as shown in FIG. 8A, the self-emission road device 100 is set on the road so that the emitting directions of the emission units 42, 44, 46, and 48 tilt to the left along the curve. A driver who drives his car from a I direction can see the lights emitted from the emission units 42 and 44. Meanwhile, a driver who drives his car from a II direction can see the lights emitted from the emission units 46 and 48.

Figure 8B:
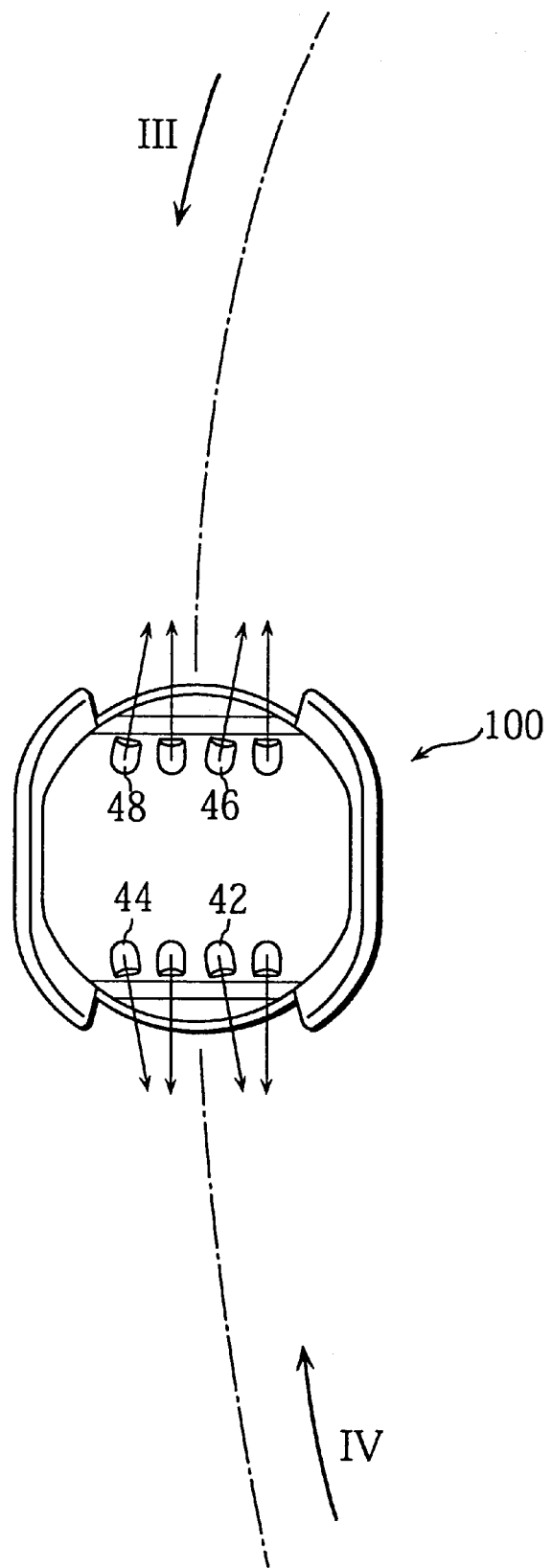

When a road makes a curve to the right as shown in FIG. 8B, the self-emission road device 100 is turned 180° angle from the setting state shown in FIG. 8A. By doing so, a driver who drives his car from a III direction can see the lights emitted from the emission units 46 and 48, while a driver who drives his car from a IV direction can see the lights emitted from the emission units 42 and 44.

Figure 8C:
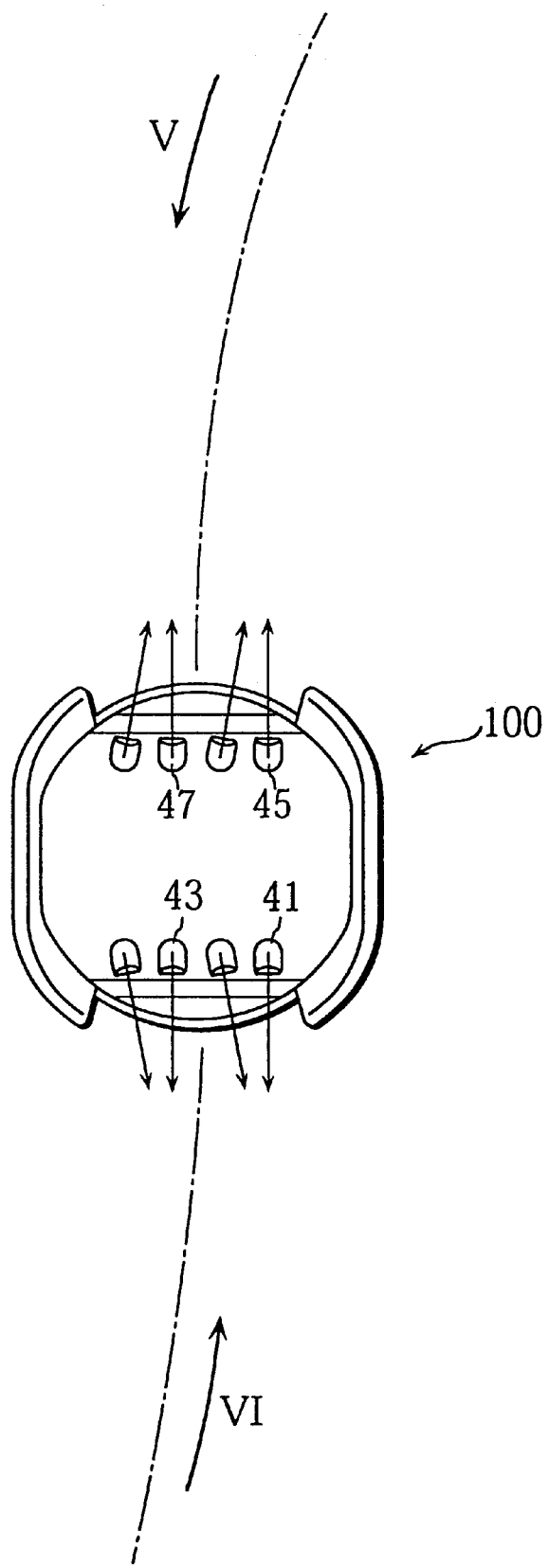

Meanwhile, suppose that a road makes an S-shaped curve as shown in FIG. 8C. In this case, the road is almost straight at a position where the curve to the left changes into the curve to the right. Thus, a driver who drives his car from a V direction can see the lights emitted from the emission units 45 and 47 designed for the straight road, while a driver who drives his car from a VI direction can see the lights emitted from the emission units 41 and 43 designed for the straight road.

Moreover, as shown in FIG. 7, it is desirable for the emission units for the straight road and the curve to be set in alternate order. By doing so, as compared to the case where the emission units having the same emitting direction are set next to each other, respective areas exposed to the lights on the light emitting faces 71 and 72 are increased in size. This is to say, the lights passing through the light emitting face 71 or 72 are emitted almost in a state where the corresponding face 71 or 72 is fully lighted (this state is referred to as the "surface emission state" hereinafter). On this view, the drivers can more clearly see the lights from the emission units.

As can be understood from the above description, by means of the present embodiment, only one kind of the self-emission road device 100 can be applied to all of the various shapes of roads. Therefore, a road does not need to be checked beforehand for selecting the self-emission road device that emits the lights in the optimum direction corresponding to the shape of the road. Consequently, expense in time and effort is eliminated. In addition, only one kind of the self-emission road device is required, so that spending on new plant and equipment is reduced to a minimum and that manufacturing costs can also be reduced.

Modifications

The present invention has been described in accordance with the stated embodiment. It should be obvious that the present invention is not limited to the embodiment, so that the following modifications can be made.

Figure 9:
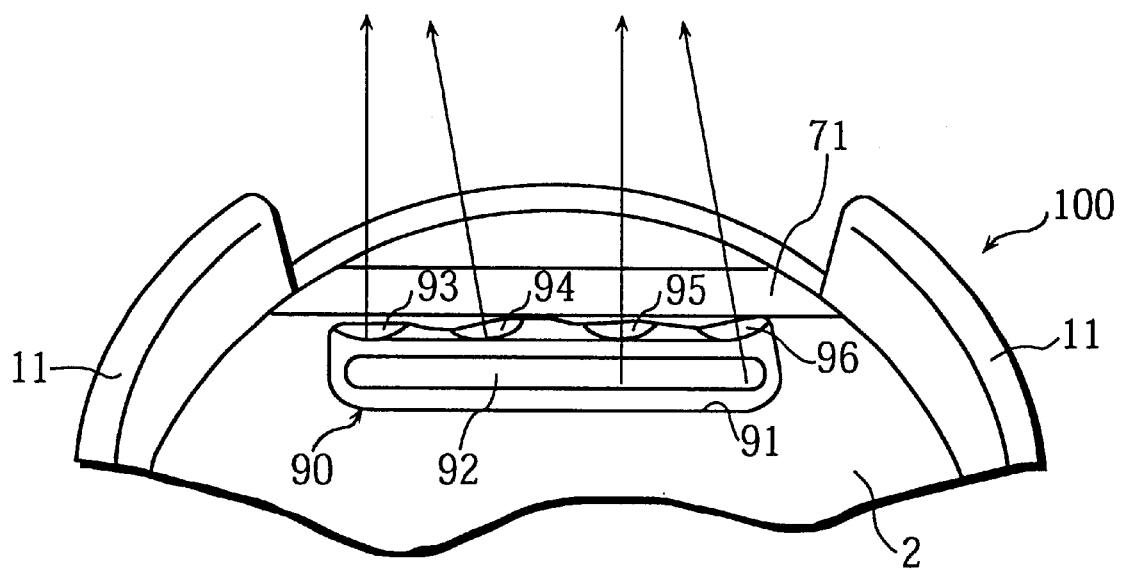
FIG. 9 shows a modification of the emission unit of the self-emission road device.

①  In the stated embodiment, the emission units 41 to 48 are separately formed as shown in FIG. 7. However, one emission unit can be formed corresponding to one light emitting face. FIG. 9 shows the construction of an emission unit 90 set corresponding to the light emitting face 71. A slim dent 91 is formed on the lower principal plane 21 of the protective board 2, and a light emitting element 92 that is shaped like a long cylinder is housed in the dent 91. As the light emitting element 92, a neon tube or the like is used.

On one side of the dent 91 that is adjacent to the light emitting face 71, four flat parts 93 to 96 are formed. These flat parts 93 to 96 form the same angles with the light emitting face 71 as the flat fronts 6 of the dents 5 of the emission units 41 to 44 as shown in FIG. 7. The light from the light emitting element 92 is emitted in two directions through the flat parts 93 to 96. One direction is perpendicular to the light emitting face 71 in the horizontal direction. The other direction forms a 10° angle with the direction that is perpendicular to the light emitting face 71 in the horizontal direction.

Parts located between the neighboring flat parts 93 to 96 on the surface of the dent 91 are also transparent. As such, the light is also emitted through these parts, thereby resulting in an enhancement for the surface emission state as compared with the construction shown in FIG. 7.

In this modification, however, the volume of the dent 91 is increased, so that strength of the protective board 2 is accordingly deteriorated. Thus, it is desirable to increase the thickness of the protrusions 26 formed for reinforcing the protective board 2.

The cross-sectional view of the dent 91, that is taken along a plane perpendicular to both the light emitting face 71 and the upper principal plane 22, is the same as the view shown in FIG. 3. However, it is desirable that a part found in FIG. 9 corresponding to the rear 51 of FIG. 3 needs to be formed so that the light from the light emitting element 92 is reflected forward to the direction of the light emitting face 71. As one example, this part may be covered with metallic foil. An emission unit set corresponding to the light emitting face 72 has the same construction as the emission unit 90 shown in FIG. 9.

② In the stated embodiment, the number of light emitting faces are two, on the assumption that the self-emission road device 100 would be set on the center line of the road. However, the number of the light emitting faces can be one, three, or four, depending on setting locations such as a sideline and a center of an intersection.

Moreover, the number of emission units provided for one light emitting face is not limited to four as in the stated embodiment and can be more than one. However, when the number is two, the effect of the surface emission state cannot be adequately obtained and the effect of warning the drivers is also reduced. Therefore, at least three emission units are preferably required.

When the number of emission units for one light emitting face is other than four, it is desirable that the respective numbers of emission units for a curve and straight road are almost equal to each other and that the emission units for the curve and straight road are set in alternate order. Also, the emitting directions of the lights from the emission units for the curve that respectively pass through two diametrically opposite light emitting faces should tilt to the same side at a certain angle with respect to the emitting directions of the emission units for the straight road.

③ In the stated embodiment, each emitting direction of the emission units for the curve forms a 10° angle with the emitting direction of the emission units for the straight road. However, the number of emitting directions of the emission units for the curve can be more than one. By doing so, the lights from the emission units can be seen in a horizontally wider space. When the road is relatively wide, in particular, the driver can see the lights from any lane and, as a result, the safety effect can be further improved. When more than three kinds of emitting directions including a straight direction are set and a plurality of emission units are provided, it is not necessary to repeat a fixed order for arranging the emission units along a light emitting face. The effect of the surface emission state can be obtained simply by not setting the emission units having the same emitting direction next to each other.

④ In the stated embodiment, the emitting directions of the light emitting diodes 4 are changed only in the horizontal direction, and the elevation angles are set at the same 2.1° angle with respect to the ground level GL. However, the number of kinds of elevation angles may be more than one for each light emitting face, with the angles of emergence in the horizontal direction varying or being kept the same. Consequently, the self-emission road device can be applied to a road which varies in the vertical direction, such as a hill.

As one example, an elevation angle of one specific emission unit may be set at an appropriate angle greater than 2.1° angle. By doing so, when the self-emission road device 100 is set at the center of the intersection located at the bottom of a hill, the driver who drives his car from the top of the hill can clearly see the light emitted from that emission unit.

This example is explained more specifically. Suppose that an angle of gradient of an average hill is 3%, and that the self-emission road device 100 is set at the bottom of the hill. In this case, a ground level GL at a point located 33 m before the self-emission road device 100 is about 1 m higher than a ground level GL where the self-emission road device 100 is set. In order to have the light pass by the point located 1.2 m high from the ground level GL of the hill, as in FIG. 4, an elevation angle θ should be set so as to have the light pass by a point located 2.2 m high from the ground level GL where the self-emission road device 100 is located. Here, tan θ=(2.2)/33, so that the elevation angle θ is about 3.8°. Even when an angle of gradient of a hill varies from the standard 3% to an extent, the lights emitted from the emission units are dispersed at a predetermined angle. Therefore, the drivers can see the lights.

By setting the emission units with the 2.1° angle and those with the 3.8° angle in alternate order, the lights can be reliably seen regardless of whether the setting position is located at a relatively flat road or at the bottom of a hill. Consequently, different kinds of self-emission road devices corresponding to different elevation angles do not need to be manufactured.

⑤ In the stated embodiment, each of the refractors 8 for the emission units 41 to 48 is formed by resin located between the corresponding flat front 6 of the dent 5 and the light emitting face 71 or 72 of the transparent protective board 2. However, a refractor may be provided at this location, independent from the prospective board 2. Alternatively, a light emitting element which is capable of emitting a light in only one specific direction may be used. Then, the light emitting elements may be set so that their emitting directions corresponds to the emitting directions shown in FIG. 7. In this case, it may be unnecessary to set the refractors 8.

⑥ In the stated embodiment, each of the flat fronts 6 of the corresponding dents 5 provided for the emission units is formed almost flat. However, a convex lens or a cylindrical lens that has a light-gathering power only in the horizontal or vertical direction may be attached to this part. In this case, the convex lens or the cylindrical lens should be placed, with the optical axis being coincident with the axis of the light beam emitted from the emission unit. As a result, the light from the emission unit can be seen from a further distance.

It should be obvious that the flat front 6 may be formed integrally in a shape of the convex lens or the cylindrical lens. Consequently, it is advantageous in costs.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A self-emission road device which is partially buried in a road surface, comprising:
   a main body which has an opening at a top;
   an emission unit which is set at an upper part of the main body and emits at least three light beams over a road; and
   a top board which is set covering the opening of the main body, and has an emission window that is transparent with the light beams from the emission unit passing through the emission window and being emitted to an outside,
   wherein emitting directions in which the light beams are emitted through the emission window include at least first and second directions, and
   wherein at least two light beams, out of the light beams emitted to the outside through the emission window, are emitted in a same direction and a light beam emitted in a different direction is situated between two light beams emitted in the same direction.

2. The self-emission road device of claim 1,
   wherein a horizontal component of the second direction forms a first angle with a horizontal component of the first direction.

3. The self-emission road device of claim 2,
   wherein the top board has another emission window which is set diametrically opposite to the emission window through which the light beams are emitted in the first and second directions, and has another emission unit which has at least three light beams emitted through the other emission window in third and fourth directions, and
   wherein a horizontal component of the third direction is diametrically opposed to the horizontal component of the first direction, and a horizontal component of the fourth direction forms a second angle with the third direction to a same side as the horizontal component of the second direction forms the first angle with the horizontal component of the first direction.

4. The self-emission road device of claim 3,
   wherein the first and second angles are equal to each other.

5. The self-emission road device of claim 1,
   wherein vertical components of the first and second directions are different to each other.

6. The self-emission road device of claim 1,
   wherein the emission unit includes:
      a plurality of light sources which are placed inside the top board and arranged along the emission window, with a number of the plurality of light sources being equal to a number of light beams; and
      a plurality of refractors, each being provided for a different light source, which respectively refract the light beams emitted by the light sources so as to have the light beams emitted through the emission window in the corresponding emitting directions.

7. The self-emission road device of claim 6,
   wherein the top board has dents, on a lower principal plane, each of which houses one of the light sources, and
   wherein each of the refractors is made up of a part located between the emission window and a front of a corresponding dent, the front facing the emission window.

8. The self-emission road device of claim 7,
   wherein the top board is made of a resin, and the dents are integrally molded.

9. The self-emission road device of claim 7,
   wherein each cross sectional profile of the dents, that is taken along a plane including the emitting direction and perpendicular to an upper principal plane of the top board, is rounded off except for the front of the dent.

10. The self-emission road device of claim 9,
    wherein each edge where the front of the dent meets other inner surfaces of the dent is rounded off.

11. The self-emission road device of claim 1,
    wherein the emission unit includes:
       a light source; and
       a plurality of refractors which are arranged along the emission window and refract a light emitted by the light source so as to have the light become a plurality of light beams and have the plurality of light beams emitted through the emission window in the corresponding emitting directions.

12. The self-emission road device of claim 11,
    wherein the top board has a dent, on a lower principal plane, which houses the light source, and
    wherein each of the refractors is made up of a part located between the emission window and a front of the dent, the front facing the emission window.

13. The self-emission road device of claim 12,
    wherein a cross sectional profile of the dent, that is taken along a plane including the emitting directions and perpendicular to an upper principal plane of the top board, is rounded off except for the front of the dent.

14. The self-emission road device of claim 13,
    wherein each edge where the front of the dent meets other inner surfaces of the dent is rounded off.

15. The self-emission road device of claim 1,
    wherein the emission unit has a plurality of light emitting elements that each emit a light beam in only one direction, with a number of the plurality of light emitting elements being equal to a number of the light beams,
    wherein each light emitting element is set so that a light beam is emitted through the emission window in a corresponding emitting direction.

16. The self-emission road device of claim 1,
    the main body further including a solar battery and a storage battery that stores electric power generated by the solar battery,
    wherein the emission unit has the light beams emitted using the electric power supplied from the storage battery.

17. The self-emission road device of claim 1,
    wherein the emission window is set forming a predetermined angle with an upper principal plane of the top board, with an edge where the emission window meets the upper principal plane being rounded off.

18. The self-emission road device of claim 1,
    wherein the emission window is formed at an edge part of an upper principal plane of the top board.

* * * * *